3,846,308
SKIP BRIDGE VALVE
Harry Richard Ahlquist, Star Route Box 219,
Rabbitt, Minn. 55706
Continuation-in-part of application Ser. No. 110,003, Jan. 27, 1971, now Patent No. 3,724,668. This application Mar. 28, 1973, Ser. No. 345,612
Int. Cl. B01d 33/26
U.S. Cl. 210—331                                    10 Claims

ABSTRACT OF THE DISCLOSURE

In a vacuum filter apparatus having at least one multiported valve head in communication with vacuum lines and compressed air lines, each said valve head having a vacuum valving mechanism comprising at least a stationary bridge plate and a wear plate, said wear plate being affixed to a plurality of tubes disposed within a hollow shaft member and rotatable therewith in sliding engagement with said stationary bridge plate, the improvement wherein said stationary bridge plate has at least one skip bridge port, said skip bridge port comprising means forming an aperture through said bridge plate directly connecting the wear plate and a main vacuum source, and means associated with said port to control the vacuum pressure exerted through said aperture means.

BACKGROUND OF THE INVENTION

This application is a continuation-in-part of my co-pending application, Ser. No. 110,003, filed Jan. 27, 1971, now U.S. Pat. 3,724,668, issued Apr. 3, 1973 (hereinafter referred to as "my earlier application," the drawings, specification, and claims, of which are incorporated herein by reference.

My earlier application related to an improved valving mechanism for a continuous vacuum filter of the disc type. Examples of such disc type vacuum filters are described under the designation "American Filter" as originally designed, and/or with the so called "Oliver Valve Mechanism," see pages 16-04 to 16-14 of Taggart's "Handbook of Mineral Dressing," 1945 edition. In such apparatus, a plurality of discs are disposed in spaced relation along a hollow shaft, each such disc being composed of a plurality of radially extending filter media covered filtering sectors ("paddles") the hollow interiors of which communicate with suction lines (tubes) located within the hollow shaft. The suction lines or tubes are independent from each other, and are connected each to a row of sectors (one from each disc) and terminate at one or both ends of the shaft with matched valve heads. The shaft is rotatable, while the valve heads are stationary, and are connected to vacuum and air sources. Rotation causes the sectors of the discs to be successively dipped into a slurry (pulp) for cake deposition by vacuum application, after which they are rotationally lifted out of the slurry for dewatering ("drying") by application of vacuum, the filtercake then being removed by suitable means including means for capturing and transporting the filtercake away from the filter.

The improved valving mechanism described in my earlier application employed a stationary bridge plate having a lower pick-up port and an upper pick-up port. Each of the pick-up ports served to provide a small controlled application of vacuum to the filtering sectors while they were still immersed in the slurry, prior to the main application of vacuum through the drying port. This vacuum was applied primarily through the lower pick-up port, and such additional vacuum as might be necessary to obtain consistent control was applied through the upper pick-up port. The vacuum was transmitted from a vacuum source to each of the pick-up ports through individual exterior vacuum lines each connected to a conventional gas control valve and then to the pick-up port, by means of a small channel running radially through the interior of the bridge plate from the peripheral surface of the bridge plate to a pick-up port.

FIGS. 1 and 2 show a general view of the skip bridge plate (the opposite end of the filter shaft would use a configuration of the opposite hand) according to my earlier application. These figures correspond to FIGS. 10 and 11 of my earlier application.

Figures 1, 2:
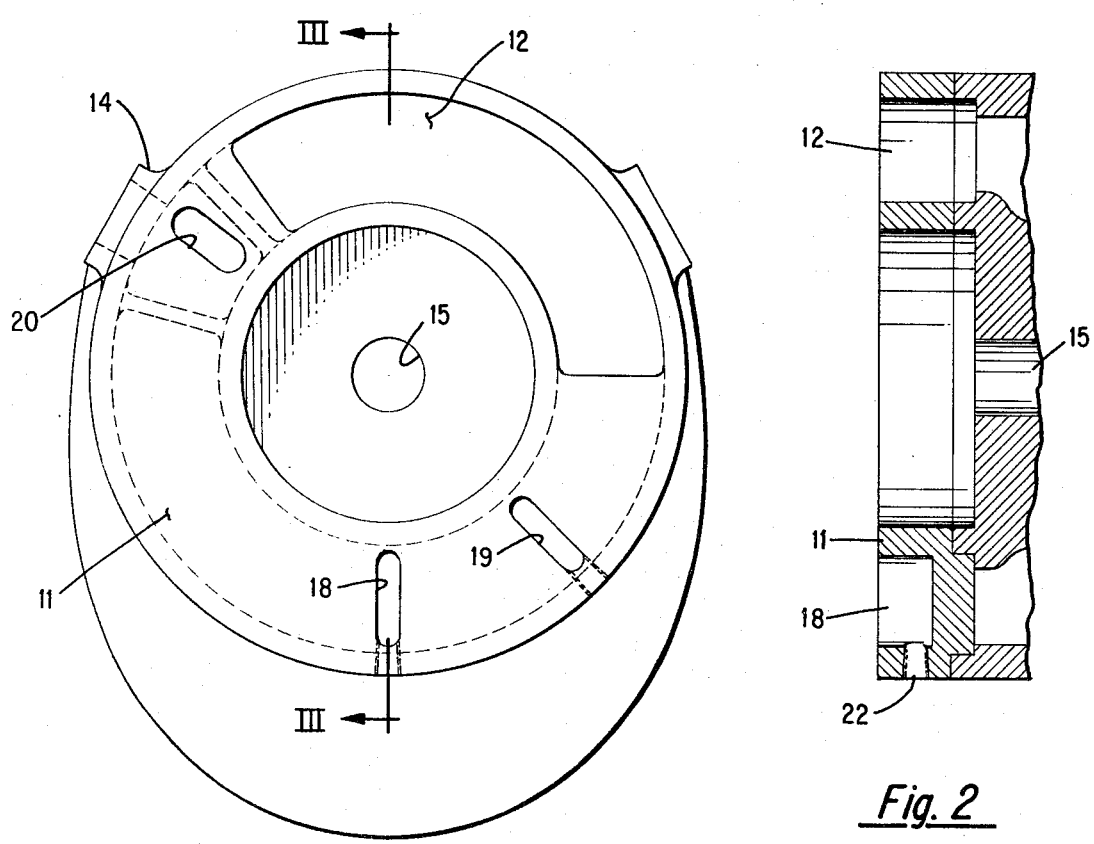
FIG. 1 illustrates the valve head of a vacuum disc filter in accordance with my earlier application.
FIG. 2 is a cross-sectional view of the valve head shown in FIG. 1, taken on line III—III of FIG. 1.

Though not shown in FIGS. 1 and 2 my earlier application discussed the wear plate which is affixed in conjunction with a plurality of tubes disposed within a hollow shaft member by means of a tubular journal means and aperture 15. The wear plate is in slideable engagement with a stationary bridge plate 11 having a drying zone 12 (suitably connected to a source of vacuum); a blow air connection 14, through which a suitable gas under positive pressure can be transmitted to blow port 20, and thence, to and through the individual tubes in the hollow shaft member. As noted above, the most important feature of the stationary bridge plate of my earlier application is illustrated by pick-up ports (or as I call them "skip bridge ports" 18 and 19 which permit control of cake thickness and consequent moisture content independent of disc speed, pulp solids, particle size, viscosity, pulp temperatures, etc. permitting moisture control through adjustment of cake thickness, and/or quantity control by adjustment of disc speed.

A distinct design characteristic is involved in the skip bridge ports in the lower portion of the bridge plate. The width of the slots must be less than the effective (allowing for worn or rounded edges) width of the solid spaces between the tubes of the matching faces. The lower port is the primary control point for cake deposition while the upper port is primarily used for a subsequent reapplication of vacuum under adverse condition when vacuum depreciates too rapidly before the sector has rotated enough to receive the full vacuum of the drying port. If the vacuum depreciates too much, a condition of "cake slipping" occurs where the filtrate in the sector interior washes back through the sector face and the formed cake slips off into the slurry.

In addition to the unique position and width of the "pick up" ports, there is additional control of cake formation by installation of a throttling valve in the ducting between the main vacuum supply and the individual port. This permits independent control of the vacuum applied through the port to the particular row of sections singly under that port's influence. This then permits additional independent control of cake thickness with respect to disc speed at maximum slurry density. Again, cake thickness control can be used for moisture control, and disc speed and/or moisture control for quantity control. This is in contrast with conventional bridge plates where they are directly dependent on disc speed.

The stationary bridge plate of my earlier application can, of course, be formed from any suitable material. The original bridge plates were in fact formed from suitable metals such as steel. The metal bridge plate must be very finely machined, within close tolerances, particularly the surface in slideable engagement with the wear plate. In fact, maintaining a high vacuum seal at the interface of the stationary bridge plate and the wear plate, while simultaneously maintaining these plates in a slideable engagement, required machining of both the bridge plate and the wear plate to extremely fine tolerances.

In addition, both the metal bridge plate and the wear plate are subject to erosion from several different sources.

The primary cause of erosion of course is friction at the interface where they are slideably engaged. Other sources of erosion include the abrasive effect of any small ore particles which pass through the filter media and into the valving mechanism, and deposits of soluble salts and/or scale from the water being sucked through the lines from the drying cakes.

As erosion due to friction increases, the seal between the bridge plate and the wear plate is degraded. The high volume water and air currents passing through the valving mechanism from the compressed air lines and/or to the vacuum source, then cause erosion in both the bridge plate and the wear plate, particularly to the plurality of ports in the wear plate, the lands, or solid spaces between adjacent ports, and corresponding areas in the bridge plate.

Thus, as the metallic bridge plate and wear plate erode at the contact surfaces, vacuum is wasted at an increasing rate, correspondingly increasing the strain on the vacuum source, decreasing the efficiency of the filter system, and increasing erosion of the ports. After a period of generally not more than four to six months, the wear has become so severe that the valving mechanism will not provide an adequate vacuum seal, and both the wear plate and the skip bridge plate must then be removed and re-machined. This obviously is costly not only in terms of dismantling the apparatus to remove the eroded parts, and in the down time during which the apparatus is unavailable, but most of all, in the cost of re-machining and replacing.

DRAWINGS

FIGS. 1 and 2 illustrate the skip bridge plate of my earlier application, as discussed in detail hereinbefore.

Figure 3:
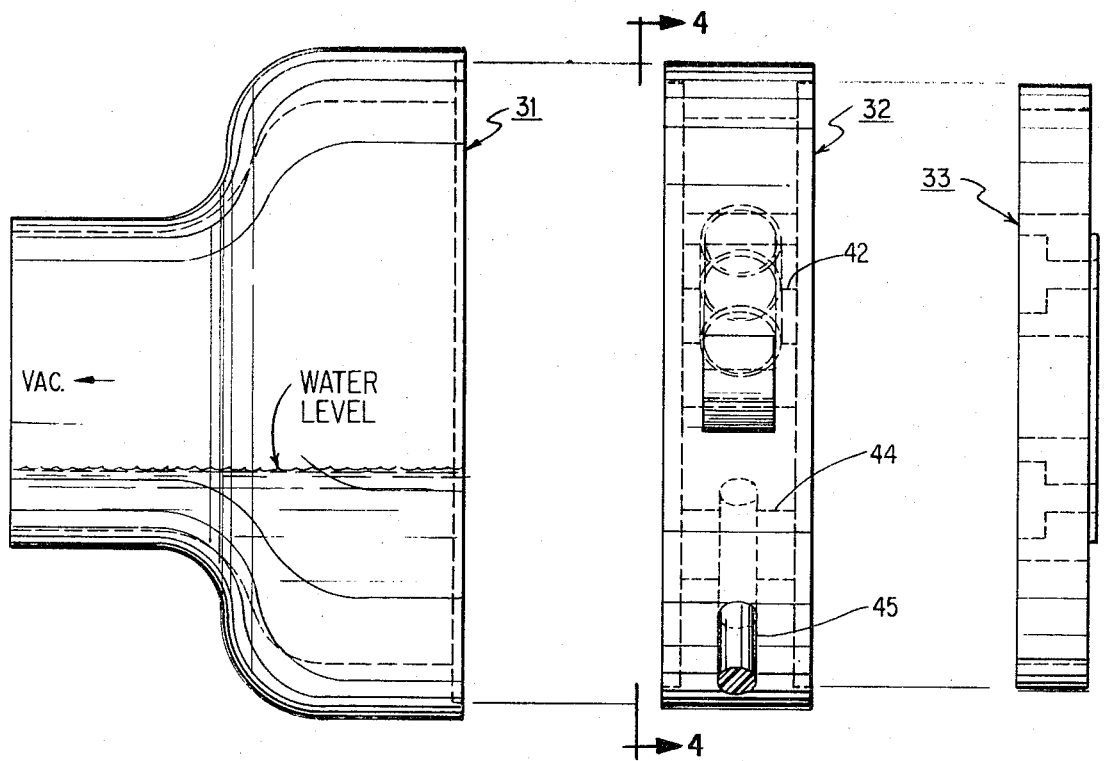

FIG. 3 is an exploded view of the three principal elements of one of the preferred valving mechanisms within the scope of my invention.

Figure 4:
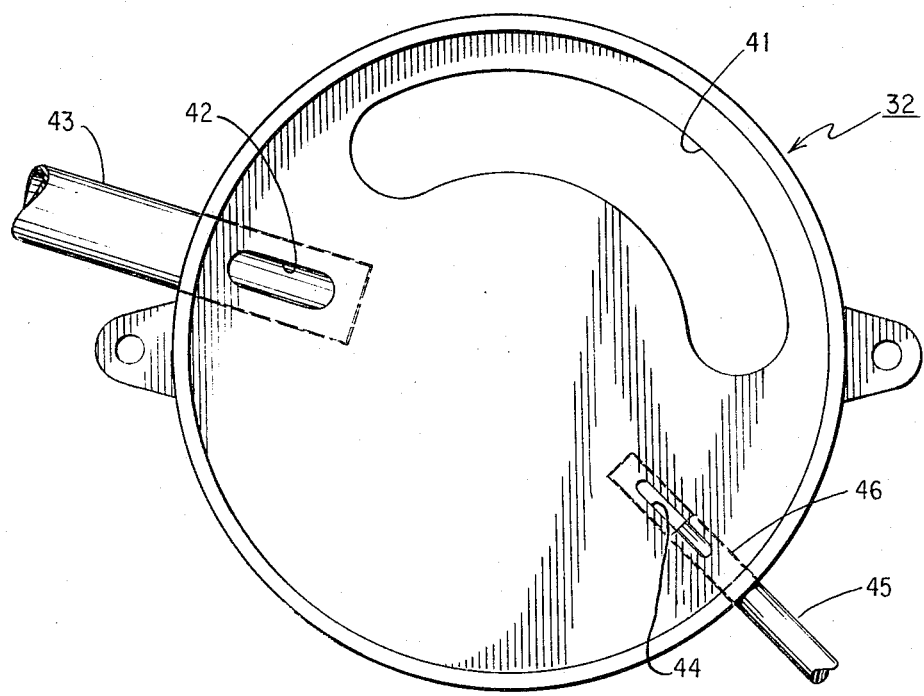

FIG. 4 is a view taken on the line 4—4 of FIG. 3, illustrating one embodiment of an improved skip bridge plate within the scope of the present invention.

SUMMARY OF THE INVENTION

The apparatus of the present invention relates to a vacuum filter apparatus having a multiported valve head in communication with vacuum lines and compressed air lines, and having a vacuum valving mechanism. The vacuum valving mechanism has at least a stationary bridge plate and a wear plate. The wear plate is affixed to a plurality of tubes disposed within a hollow shaft member and rotatable therewith in sliding engagement with the stationary bridge plate. In the apparatus of the present invention, the stationary bridge plate has at least one skip bridge port, said skip bridge port comprising means forming an aperture through the bridge plate and directly connecting a suitably positioned port in the wear plate and the vacuum reservoir or main vacuum source, and means associated with said aperture means whereby the quantity of vacuum being applied to the filter sections can be adjusted or controlled.

As noted, the skip bridge plate of the present apparatus is characterized by at least one pick-up port comprising means forming an aperture in the skip bridge plate between a vacuum reservoir on one side of the skip bridge plate and the wear plate on the opposite side of the skip bridge plate, whereby a controlled vacuum is applied to each filter sector while it is still immersed in the slurry. Quantitative control of the application of the vacuum can be obtained by any suitable means, preferably by adjusting the effective aperature in the pick-up port.

Referring to the accompanying drawings, FIG. 3 is an exploded view of one embodiment of a valving mechanism within the scope of the present invention. This particular embodiment has 3 principal elements, a vacuum reservoir, a skip bridge plate and a wear plate. The vacuum reservoir or bell shaped member 31 has one end suitably connected to a source of vacuum, and the other end engaged in vacuum tight contact with one side of skip bridge plate 32. The other side of skip bridge plate 32 is adapted to slideably engage one surface of a wear plate 33 while maintaining a vacuum tight seal at the surface. The other side of wear plate 33 is attached to the end of the hollow shaft (not shown) of the first apparatus, the hollow shaft having a plurality of tubes which correspond in number and alignment with the plurality of ports in the wear plate.

FIG. 4 illustrates one embodiment of a skip bridge plate within the scope of the present invention. The skip bridge plate has a large aperture 41 forming a drying port, a snap blow port 42 and blow air connector 43, all of which substantially corresponds both in function and location with corresponding elements 12, 20 and 14 respectively in FIG. 1. It also has a pair of opposed lugs to facilitate affixing of the skip bridge plate to the body of the filter appaartus in a stationary position. In the embodiment illustrated in FIG. 4, skip bridge plate 32 has a single pick-up port or skip bridge port 44, which is an elongated aperture all the way through the skip bridge plate, thereby permitting application of vacuum directly from the vacuum reservoir to the correspondingly positioned port in wear plate 33.

As noted earlier, the quantity of vacuum being applied can be controlled by any suitable means. In the illustrated embodiment, this is done by adjusting the effective opening in skip bridge port 44, using a sliding plug means 45, positioned in a channel 46 running radially through the skip bridge plate from the peripheral surface of the skip bridge plate to a point beyond the inner end of the skip bridge port 44. In this manner, by adjusting the depth of the sliding plug means 45, it is possible to adjust the effective aperture of skip bridge port 44 to any desired smaller cross-sectional area. In fact, if desired for some particular reason, it is possible to even totally cut off the application of any vacuum through skip bridge port 44 by pushing the plug means to a point in the channel beyond the inner end of the opening in skip bridge port 44. The sliding plug means should of course be longer than the maximum length of radial channel 46, so that at all times one end of the plug extends beyond the end of channel 46 and beyond the peripheral surface of skip bridge plate 31, thereby facilitating adjustment.

Plunger type plug means 45 is perhaps the simplest and most direct means of controlling the amount of vacuum being drawn through skip bridge port 44. A number of substitute arrangements will, however, be obvious to those skilled in the art, and would include, for example, a slotted twisting plug type valve or a simple bleed valve in channel 46 at the peripheral surface of the skip bridge plate. Using such a valve, a small amount of air can be allowed to bleed through channel 46. By adjusting the bleed valve it will be possible to control the amount of air which is drawn into the system, and thereby control the amount of vacuum effected through skip bridge port 44. This would of course place additional strain on the vacuum source, and could be a source of erosion in a metallic bridge plate, though, as will be seen hereinafter, erosion problems would be relatively insignificant with a rigid elastomeric skip bridge plate.

The blow air connector can be any suitable means adapted to work in conjunction with blow port 42. In the embodiment illustrated in FIG. 4 the blow air connector consists of a hollow, tubular member 43 extending from outside the peripheral surface of the bridge plate where it is suitably connected to a source of compressed air, and running radially through the bridge plate to a blow port 42. The tubular member can be connected to blow port 42 by any suitable means; preferably by a slot cut in one surface of the tubular member corresponding to, and in alignment with, the aperture forming the blow port 42. While the embodiment illustrated employed snap blow air techniques it will of course be obvious that a snap blow or continuous flow air blow technique can be employed, or, the cake can be scraped off by other well known procedures.

As in my earlier application, the entire valve head is positioned to provide filter cake release when the leading edge of the sector is horizontal, at which point the cake will fall clear of the filter tube slots. Standard practice dictates that the tube be centered on the blow slot. I have found that it is advantageous to employ a slot shaped blow port located high to the tubing exposure when the "snap blow" air is applied thereby minimizing transportation of any accumulated filtrate back to the filter cake.

As noted above, one of the distinct design characteristics involved in the skip bridge ports of my earlier application concerned the width of the slots of the skip bridge ports. The wides of the slots was to be less than the effective (allowing for rounded edges) width of the solid spaces between the ports in the wear plate. This same design characteristic is also preferred in the skip bridge port (or skip bridge ports) of the present apparatus. By limiting the width of the skip bridge port in this manner, it is possible to effect even more uniform control of the filter cake, inasmuch as only a single tube is subject to the influence of the pick-up port at any given moment.

The skip bridge plate of FIG. 4 has been specifically designed to facilitate the reversal of the plate. Thus, as has been pointed out, a filter apparatus of the type discussed hereinbefore, generally has two vacuum valving mechanisms, one at each end of the apparatus, with the bridge plate at one end being a mirror image of the corresponding plate at the other end. Since all the ports in the skip bridge plate of FIG. 4 go all the way through the skip bridge plate, it is possible to machine the surface of bridge plate 32 which had been adjacent to vacuum reservoir 31, and employ it at the opposite end of the filter apparatus as the surface in contact with the wear plate. In such a case it is only necessary to effect a 180° rotation of tubular member 43.

A valving mechanism of the type illustrated in FIGS. 3 and 4 has a still further advantage attributable to the design of vacuum reservoir member 31. As noted above, the valving mechanism of my earlier invention employed separate vacuum lines to the skip bridge ports. As illustrated in FIG. 2, the vacuum was supplied to skip bridge port 18 through connecting channel 22. This is in contrast to the mechanism of the present invention, where pick-up port 44 passes all the way through the bridge plate and directly connects to vacuum reservoir 31.

Almost all of the water in a given tube, or suction line is sucked out of the tube while under the influence of drying port 12 of FIG. 1, (or equivalent drying port 41 of FIG. 3). When the tube subsequently comes under the influence of the pickup port, it is principally air which was drawn through pick-up port 18 and channel 22 into the vacuum source.

As the air (which is already at substantially 100 percent relative humidity) was put under vacuum, its volume was expanded several times over, thereby super cooling the air, and causing condensation of the water vapor. When the skip bridge port was throttled down, the expansion became even greater, the cooling effect was correspondingly increased, and the condensation product changed from water to snow and/or ice particles, which eventually clogged up the system.

Employing the vacuum reservoir member 31 of FIG. 3, the air is drawn into the vacuum reservoir at a point below the water level. In this way, substantially all of the expansion of the air, the condensation effects, and thermal changes take place below the water level, thereby preventing blockage of the system from condensed snow and ice, etc.

It will of course be obvious that more than one skip bridge port can be employed, where for some reason this was desired. In such a case, the additional port or ports should preferably be so positioned that any given tube will at any given time be under the influence of only one skip bridge port. It will also be obvious that elements 31 and 32 of FIG. 3 can be formed as a single combined member, though it would of course be somewhat more difficult to form, and would preclude reversing of the skip bridge plate as described above.

PREFERRED EMBODIMENT

While this valve, like that of my earlier application, can be formed from metal or any other suitable material, I have obtained several highly unexpected results where some elements of the valve are formed from a rigid elastomeric material. The preferred embodiment of the apparatus of my invention is a valving mechanism of the type illustrated in FIGS. 3 and 4 and described hereinbefore, wherein the skip bridge plate 32 is formed from a suitable rigid elastomeric material such as, for example, polyurethane or rigid polyvinylchloride or the like. I have also found that the vacuum reservoir (bell-shaped member, 31) can advantageously be formed from the same materials, though as will be seen hereinafter, the most significant advantages are obtained by forming the bridge plate from such materials.

There are a wide variety of suitable rigid polymeric materials, thermoplastic and thermosetting, which can be employed to form the required parts. Insofar as my invention is concerned, it is only necessary that the elastomeric material be capable of yielding finished parts which will substantially be self supporting or undeformed, under very high vacuum pressure. The choice of a particular material is determined by a number of unrelated factors, most of which are at best only marginally relevant to the novel apparatus of the present invention per se.

For example, problems encountered in employing a particular polymer to form thick sections (e.g., wall thicknesses in excess of an inch or even two or three inches or more), peculiarities of catalytic or other curing of the polymer composition to obtain substantially uniform cure of such thick wall sections, and stability properties as to heat, light, ozone, or the like, to mention but a few. In considering the stabilization properties, it is also necessary to consider the possible sensitivity of a given polymer composition to the ore, filtrate, atmosphere or other material being filtered and/or the extraneous impurities, and the like which one must anticipate encountering in connection with such ores.

EXAMPLE

Parts were molded from polyurethane to form a reservoir member and a skip bridge plate corresponding in those shown in FIGS. 3 and 4. The parts were formed from American Cyanamid polyurethane D–7, and the cured parts had a hardness of about 75–80 on the Shore D Scale. These parts otherwise met standard specifications, and were tested in a regular production type filter apparatus. The various apertures in the bridge plate, drying port 41, snap blow port 42, and skip bridge port 44 etc. were formed in the mold, and each passed all the way through the skip bridge plate. The apertures for the skip bridge port and the snap blow port were both formed as shown in the drawings, as elongated slots, the radial length of the slots being substantially equal to the diameter of the ports in the wear plate. A pipe, formed from the same material and having a slot cut in one surface to correspond to snap blow port 42 was employed as blow air conductor 43, its other end being suitably connected to a source of compressed air. A solid polyurethane cylinder corresponding in configuration to channel 46 was employed as the plug member 45. A wear plate was also prepared from the same polyurethane, and it also was tested in the same production equipment.

The experimental parts produced in the Example were employed in several different combinations in production-type apparatus, and the results were most surprising in a number of respects. Employing a polyurethane vacuum reservoir, and a polyurethane skip bridge plate, with a metal wear plate, the skip bridge plate was essentially self-seating, and did not have to be machined. Even after six months or more, the mating of the wear plate surface and the skip bridge plate surface were still within extremely fine tolerances during operation.

In fact the quality of the vacuum seal, after 6 months, was not significantly deteriorated from the seal obtained when the pieces were new. The rigid elastomeric members still seemed to retain enough "give" or cold flow or the like, that the skip bridge plate continued to be self lubricating and self-seating even as the surface of the bridge plate was gradually worn away. It is possible that the very high vacuum being drawn (26 inches of mercury) which is sufficient to draw the elastomeric skip bridge plate and the polyurethane vacuum reservoir towards the frame of the filter apparatus, is also sufficient to produce sufficient elastomeric or plastic flow even in very rigid compositions, to permit small movement of the bridge plate sufficient to promote seating.

In addition, the edges of the apertures 41, 42 and 44 remained relatively sharp as opposed to past experience where vacuum currents and the water being pulled through the system tended to round off the edges of the apertures on the surface of the metal bridge plate. In the past, such erosion gradually changed the effective openings and thereby necessitated adjustment of process conditions, machine settings and the like.

On the basis of the testing it was found that the skip bridge plate had a useful life in excess of fifteen months, at which point it could be turned over and the heretofore disengaged surface (which was in contact with the vacuum reservoir) could be employed as the wear surface at the other end of the filter apparatus, thereby giving the bridge plate an overall useful life in excess of two and one-half years. This opposite side of the bridge plate is also self seating, and the reversal can be accomplished without machining or other special preparation. The other components of the test valve mechanism, the vacuum reservoir and the wear plate, were estimated to have a useful life in excess of 10 years.

Still, more surprising, when the polyurethane wear plate was employed in conjunction with a metal skip bridge plate, similar results were not obtained, and vacuum was lost at the mating surfaces at least as fast as with an all metal valve. Also, where all three components of the valve head were of polyurethane, the same advantages were not observed, perhaps because there was no differential in wear surfaces. Thus the unique additional advantages described above can only be obtained where at least the skip bridge plate, and preferably the skip bridge plate and the vacuum reservoir member are formed from a rigid elastomeric material and the wear plate is of a different material, preferably metal.

From past experience, in order to maintain vacuum preservation, both the bridge plates and the wear plates on metal valves must be resurfaced approximately every six months. Using typical cost figures, resurfactng such a valve costs approximately two hundred dollars ($200.00) per resurfacing, with an overall useful life of approximately five years. Including an original cost of eleven hundred dollars ($1,100.00) for the new assembly, this means that such a metal valve would cost approximately six hundred dollars ($600.00) per year, overall. A corresponding urethane valve assembly such as that produced in the Example costs less than one hundred five dollars ($105.00) per year even with the previously described conservative estimates as to useful life (about 10 years for the bell-shaped member 31 and the steel wear plate, and about 2½ years for the bridge plate).Thus, the metal valve assembly costs approximately six times as much to employ as the polyurethane-metal valve assembly of the Example, without even taking into account machine down-time and lost production, etc.

It will, of course, be obvious that many changes, alterations and substitutions can be made in the specific parts, configurations and materials described hereinbefore without departing from the spirit and scope of my invention. It is my intention to be limited only by the appended claims.

I claim:

1. In a vacuum filter apparatus having at least one multiported valve head in communication with vacuum lines and compressed air lines, said valve head having a vacuum valving mechanism comprising at least a wear plate and stationary bridge plate having a drying port said wear plate being affixed to a plurality of tubes disposed within a hollow shaft member and rotatable therewith in sliding engagement with said stationary bridge plate said filter apparatus also having removal means for removing a collected filter cake; the improvement wherein said stationary bridge plate has, in addition to said drying port, at least one skip bridge port, said skip bridge port comprising means forming an aperture through said bridge plate directly connecting the wear plate and a vacuum reservoir, and means associated with said skip bridge port to control the degree of vacuum pressure exerted through said aperture means.

2. The apparatus according to claim 1 wherein said drying port and said skip bridge port each pass completely through the skip bridge plate from a surface of the skip bridge plate in sliding engagement with said wear plate through to a surface in contact with a vacuum reservoir means; whereby said skip bridge plate can be reversed and employed as a skip bridge plate having a configuration of the opposite hand, at the opposite end of said hollow shaft.

3. Apparatus according to claim 2 wherein said bridge port passes through said bridge plate and connects with said reservoir means at point below the residual water level in said reservoir means.

4. Apparatus according to claim 2 wherein said means associated with said skip bridge port to control the vacuum pressure, comprises a plug means operable from outside the valving mechanism.

5. The apparatus according to claim 2 wherein said vacuum valving mechanism comprises a vacuum reservoir means, a stationary bridge plate, and wear plate, and wherein at least said bridge plate is formed from a rigid elastomeric polymer, and said wear plate is formed from a suitable metal.

6. The apparatus according to claim 1 wherein the width of each skip bridge port is no greater than the effective width of the solid spaces between the ports of the wear plate.

7. Apparatus according to claim 1 wherein said removal means includes a blow port in said bridge plate.

8. The apparatus according to claim 7 wherein improved timing is secured by placing the blow port slot high with respect to the shaft tubing exposure when "blow" air is applied whereby to minimize return of filtrate to the filtercake.

9. The apparatus according to claim 1 wherein said vacuum valving mechanism comprises a vacuum reservoir means, a stationary bridge plate, and a wear plate, and wherein at least said bridge plate is formed from a rigid elastomeric polymer, and said wear plate is formed from a suitable metal.

10. The apparatus according to claim 9 wherein said vacuum reservoir means, and said bridge plate are formed from polyurethane.

References Cited
UNITED STATES PATENTS

| | | | |
|---|---|---|---|
| 3,452,874 | 7/1969 | Keller et al. | 210—331 |
| 3,724,668 | 4/1973 | Ahlquist | 210—331 |
| 3,471,026 | 10/1969 | Riker | 210—331 X |
| 3,455,454 | 7/1969 | Sheaffer | 210—331 X |

FRANK A. SPEAR, Jr., Primary Examiner

U.S. Cl. X.R.

210—333, 347